United States Patent
Hagenlocher

(10) Patent No.: US 9,806,574 B2
(45) Date of Patent: Oct. 31, 2017

(54) LOW LOSS PERMANENT MAGNET EXCITED ELECTRIC MACHINE

(75) Inventor: Roland Hagenlocher, Planegg (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 206 days.

(21) Appl. No.: 14/362,732

(22) PCT Filed: Dec. 23, 2011

(86) PCT No.: PCT/EP2011/074206
§ 371 (c)(1),
(2), (4) Date: Oct. 15, 2014

(87) PCT Pub. No.: WO2013/091736
PCT Pub. Date: Jun. 27, 2013

(65) Prior Publication Data
US 2015/0042197 A1 Feb. 12, 2015

(51) Int. Cl.
*H02K 3/28* (2006.01)
*H02K 21/00* (2006.01)
*H02K 3/00* (2006.01)

(52) U.S. Cl.
CPC ............. *H02K 3/28* (2013.01); *H02K 21/00* (2013.01); *H02K 3/00* (2013.01); *H02K 2213/03* (2013.01)

(58) Field of Classification Search
CPC ...... H02K 3/28; H02K 2213/03; H02K 21/00; H02K 21/028

(Continued)

(56) References Cited

U.S. PATENT DOCUMENTS 2,094,062 A * 9/1937 Darlington ........... H03H 9/0095
178/48
2,300,520 A * 11/1942 Pollard .................... H02K 3/20
310/183

(Continued)

FOREIGN PATENT DOCUMENTS

EP 1104086 A1 5/2011
JP 2001211681 8/2001

(Continued)

OTHER PUBLICATIONS

Design and Analysis of a Permanent Magnet Generator for Naval Applications by Jonathan E. Rucker Masters in Business Administration Kenan-Flagler Business School, University of North Carolina at Chapel Hill, Published 2005.*

(Continued)

*Primary Examiner* — Michael Andrews
*Assistant Examiner* — Maged Almawri
(74) *Attorney, Agent, or Firm* — Brinks Gilson & Lione

(57) ABSTRACT

A permanent magnet excited electric machine includes a stator and a moving part movable relative to the stator. One of the stator and moving part has an electric winding system in the form of a single or multiple 3-phase system. The other one of the stator and moving part has permanent magnets. The winding system, in the form of a delta connection, has an inductance such that the related total reactance $x_B$ during rated operation according to $x_B = \omega_B \cdot L_Y \cdot P_B / (Z_{3P} \cdot U_{i,B}^2)$ is at least 0.8, wherein $\omega_B$ is the electric angular frequency of the winding system during rated operation, $L_Y$ is the phase inductance of the winding system in star connection, $P_B$ is the power of the machine during rated operation, $Z_{3P}$ is the number of 3-phase systems of the machine, and $U_{i,B}$ is the amount of the induced conductor voltage during rated operation.

6 Claims, 2 Drawing Sheets

(58) Field of Classification Search
USPC .................................................. 310/178–210
See application file for complete search history.

(56) References Cited

U.S. PATENT DOCUMENTS

| | | | | |
|---|---|---|---|---|
| 2,649,561 | A * | 8/1953 | Hutchins ................ | H02K 17/04 310/198 |
| 4,896,063 | A * | 1/1990 | Roberts ................. | H02K 17/28 310/184 |
| 5,189,357 | A * | 2/1993 | Woodson ................ | H02K 3/28 318/737 |
| 5,510,689 | A * | 4/1996 | Lipo ..................... | H02P 6/187 318/807 |
| 6,034,460 | A * | 3/2000 | Tajima ................. | B60L 15/025 310/156.53 |
| 6,441,523 | B1 * | 8/2002 | Koharagi ............. | H02K 1/2733 310/156.28 |
| 7,372,676 | B2 * | 5/2008 | Cullen .................. | H02P 29/02 361/23 |
| 8,358,040 | B2 * | 1/2013 | Komuro et al. ........ | H01F 1/053 310/10 |
| 2005/0017591 | A1 * | 1/2005 | Brewster ................ | H02K 29/03 310/179 |
| 2005/0269892 | A1 * | 12/2005 | Duff, Jr. ............... | H02K 17/185 310/212 |
| 2006/0087776 | A1 * | 4/2006 | Cullen .................. | H02P 29/02 361/23 |
| 2007/0090713 | A1 * | 4/2007 | Arita .................... | H02K 21/042 310/181 |
| 2010/0033035 | A1 * | 2/2010 | Hosle .................... | B02C 17/24 310/49.46 |
| 2013/0225360 | A1 * | 8/2013 | Hirn ...................... | B62M 6/75 476/11 |
| 2014/0292432 | A1 * | 10/2014 | Yamada ................. | G04F 5/063 331/156 |

FOREIGN PATENT DOCUMENTS

| | | |
|---|---|---|
| WO | WO 01/63720 | 8/2001 |
| WO | WO2005/011078 | 2/2005 |

OTHER PUBLICATIONS

Fundamentals of Electrical Machines, Juha Pyrhönen, LUT, Department of Electrical Engineering, 2012 Masters thesis.*
2012 Masters Thesis, Lappeenranta University of Technology Faculty of Technology LUT Energy Electrical Engineering Uzhegov Nikita Highspeed Solidro.*
STIC 2800 EIC Detailed Search Report 537548 by Benjamin Martin.*
IP.com Search NPL Search.*
STIC EIC 2800 Search Report #537548 dating Mar. 20, 2017.*
R. H. Park, et al., The Reactances of Synchronous Machines, Transactions of the American Institute of Electrical Engineers, Apr. 1, 1928, pp. 514-535, vol. 47, No. 2.
International Preliminary Report on Patentability for PCT/EP2011/074026, dated Jul. 3, 2014.
International Search Repeort issued on Dec. 20, 2012 in corresponding application PCT/EP2011/074026, pp. 1-3.

* cited by examiner

LOW LOSS PERMANENT MAGNET EXCITED ELECTRIC MACHINE

RELATED APPLICATIONS

The present application claims the benefit under 35 U.S.C. §371 of International Patent Application No. PCT/EP/2011/074026, having an international filing date of Dec. 23, 2011, the content of which is incorporated herein by reference in its entirety.

FIELD

The present invention relates to a permanent magnet excited electric machine comprising a stator part and a moving part that is movable in relation to the stator part.

BACKGROUND ART

The permanent magnet excited electric machine according to the invention may be an electric motor or a generator for generating current or also a combination of both, which selectively operates as motor or as generator. The electric machine according to the invention may be a rotary or a linear machine. In the following, reference will be made mainly to rotary machines, however, all statements hold analogously for linear machines as well.

The electric machine according to the invention preferably is commutated electronically, i.e. it is connected in operation to electronic functional units by means of which current can be supplied to the winding coils of the winding system for a respective suitable time phase or by means of which current can be withdrawn from the winding coils in the respective suitable time phases. In the following, reference will be made predominantly to electronically commutated machines, but a large part of the statements made applies analogously also for machines that are not commutated electronically.

With respect to the electric machine according to the invention, there are the following two basic design possibilities: either the stator part is provided with the winding coils of the winding system and the moving part is provided with the permanent magnets; this design has the advantage that no current for the winding coils has to be supplied to the moving part and no current has to be discharged from the winding coils, respectively. However, it is also basically possible in the contrary to provide the stator part with the permanent magnets and the moving part with the winding coils.

In permanent magnet excited electric motors, electric current in a specific amount and with a specific sign is supplied to each of the winding coils for certain time phases. As soon as the rotor rotates, the permanent magnets (positioned e.g. on the rotor) induce a voltage in the winding coils (positioned e.g. on the stator); this induced voltage usually is briefly referred to as $U_i$ or EMF.

In the development of such machines in the past, great efforts were made to improve the performance and efficiency of such machines. Despite this, there are mostly considerably losses arising during operation that do not only affect the efficiency of the electric machine, but also entail additional problems, such as e.g. strong heating of the machine, resulting in extensive cooling requirements for the machine in its entirety.

SUMMARY

It is the object of the present invention to make available a permanent magnet excited electric machine, in particular in the higher performance range, which can be operated with comparatively little loss.

This object is met by a permanent magnet excited electric machine according to claim 1.

A permanent magnet excited electric machine according to the invention comprises a stator part and a moving part that is movable in relation to the stator part, one of said stator and moving parts having an electric winding system in the form of a single or multiple 3-phase system, and the other one of said stator and moving parts having permanent magnets. The permanent magnet excited electric machine is designed for a rated power in the range between 100 kW and 20 MW. The winding system has an inductance such that the related total reactance $x_B$ in rated operation according to $x_B = \omega_B \cdot L_Y \cdot P_B / (Z_{3P} \cdot U_{i,B}^2)$ is at least 0.8.

In said equation:
$\omega_B$=electric angular frequency of the winding system in rated operation,
$L_Y$=phase inductance of the winding system, in star connection or transformed to star connection, respectively,
$P_B$=power of the machine in rated operation,
$Z_{3P}$=number of 3-phase systems of the machine,
$U_{i,B}$=amount of the induced conductor voltage in rated operation.

According to the invention, the winding system is connected in the form of a delta connection. A permanent magnet excited electric machine, in particular a PM machine in an enhanced performance range, can be operated with comparatively little loss, as will still be explained in more detail in the following.

Previously it was avoided to connect larger electric PM machines with relatively high rated power in a delta connection. For, with such machines, due to the construction of the same, the induced voltage $U_i$ or "EMF" mostly contains a significant 3rd harmonic (e.g. greater than 5% of the fundamental harmonic). In a delta connection, the winding of the winding system for the 3rd harmonic (and other harmonics) is short-circuited (the voltages and currents add up, as they are phase-shifted by 360°), with the result that a circulating current arises in the winding system that is caused by the voltages of the 3rd harmonic and, due to the resistance of the winding, leads to ohmic losses. With a machine in delta connection, there are thus created additional ohmic losses, temperature increases and torques. The maximum values thereof are present at very low speeds n, e.g. n/100 to $n_B/1000$, in which $n_B$ is the rated speed (or nominal speed).

However, with high power density PM machines used according to the invention, the inductance is so high that the short-circuit current of the 3rd harmonic arising in the winding system remains low and causes only little additional losses (e.g. 0.001 . . . 0.01% of the rated power $P_B$). It has been found out by the inventor of the present invention that the short-circuit current of the 3rd harmonic has still other effects which are advantageous in light of the present background: for, on the one hand, the circulating current or short-circuit current in the winding system caused by the 3rd harmonic has the effect that the 3rd harmonic of the iron B-field is attenuated, so that the iron losses caused by the 3rd harmonic are reduced. The additional iron losses saved by this short-circuit current may be a multiple of the additional ohmic losses caused by the circulating current (especially at higher speeds n of the machine). Moreover, the idle-operation sound components caused by the 3rd harmonic (and others) are compensated to a very large extent, except at very low speeds n (e.g. up to a speed $n_B/100$, as of which a (very rapid) continuous decrease with increasing n takes place).

The invention can be used in particularly advantageous manner with a permanent magnet excited machine with concentrated winding (i.e. with individual coils) that is operated on one or more active converter units and the (3-phase or 6-phase or multiple 3-phase) winding of which is connected in delta connection.

The present invention can be used to advantage with high power density machines in the higher performance range in which, for the afore-mentioned reasons of high short-circuit current caused by the 3rd harmonic of the induced voltage, it was avoided before to connect the winding system in delta connection.

In accordance with an advantageous embodiment of the invention, the permanent magnet excited electric machine is designed for a rated power in the range between 1 MW and 3 MW.

In accordance with a further advantageous embodiment of the invention, the permanent magnet excited electric machine is designed for a rated power in the range between 3 MW and 6 MW.

In accordance with a still further advantageous embodiment of the invention, the permanent magnet excited electric machine is designed for a rated power in the range between 6 MW and 15 MW.

In a further embodiment of the invention, the permanent magnet excited electric machine has a pole number 2p of at least 10 (wherein p=number of pole pairs of the machine).

BRIEF DESCRIPTION OF DRAWINGS

The invention will now be elucidated in more detail with reference to the drawings wherein.

DETAILED DESCRIPTION

Figure 1:
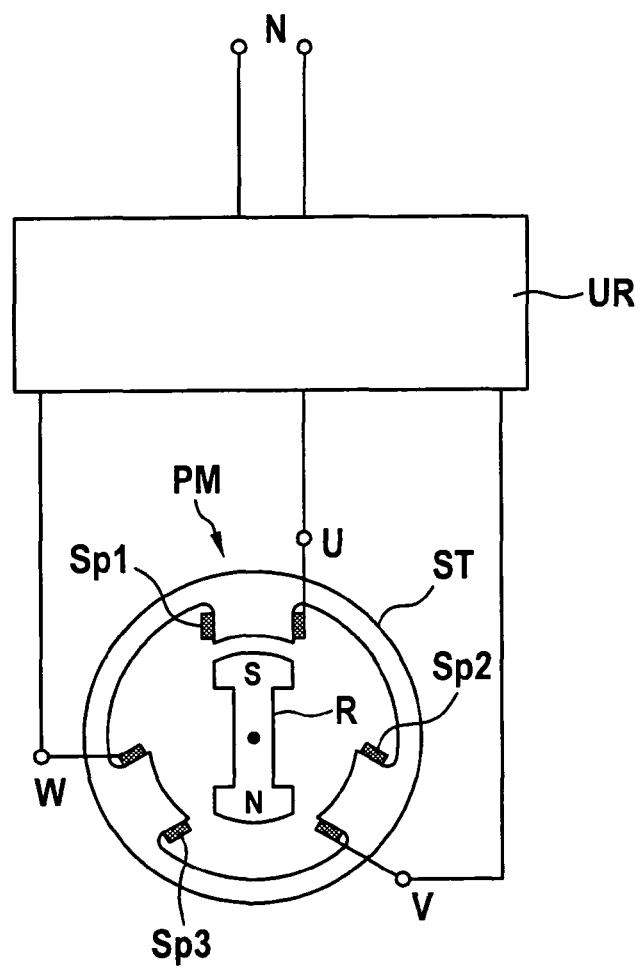
FIG. 1 shows a schematic diagram of an embodiment of a permanent magnet excited electric machine with an electric winding system provided in the form of a 3-phase system and connected to a converter unit.

The invention will be elucidated in more detail hereinafter by way of FIGS. 1 to 3. FIG. 1 shows a schematic diagram of an embodiment of a permanent magnet excited electric machine (in the following referred to as PM machine). The machine PM comprises a stator part (also stator) ST and a moving part (in the instant case a rotor) R that is movable in relation to the stator part. Stator ST comprises a winding system in the form of a single or multiple electric 3-phase system. Rotor R contains permanent magnets S and N for forming the respective poles. The winding system may also be provided in the form of a 6-phase or multiple 3-phase winding. The machine in the instant case is a PM machine with concentrated winding (i.e. with individual coils in the respective strand or phase, schematically illustrated here as Sp1, Sp2, Sp3). Rotor R is illustrated schematically with two poles 2p (pole pair number p=1). However, the machine may also have a different number of poles, preferably a pole number 2p of at least 10 (p=pole pair number). The PM machine according to the invention may be an electric motor or a generator for generating current or also a combination of both, which selectively operates as motor or as generator. The electric machine according to the invention may be a rotary or a linear machine. In FIG. 1, there is shown a rotary machine to which reference will be made in the following, however, all statements made are applicable analogously to linear machines as well.

The PM machine according to the invention is operated on a converter UR connected upstream of the 3-phase voltage system of the machine. The converter UR generates an alternating voltage appropriate for the machine PM and, both in operation as a motor and in operation as a generator, can produce the corresponding voltages and currents between machine PM and mains N in terms of amount and phase. Converter UR serves for electronic commutation of the machine (optionally via a resolver system or the like), i.e. at the terminals of phases U, V, W of the winding system, the converter UR provides a 3-phase system by means of which the machine is operated. The machine may also be operated with several converter units that have the function to provide a 3-phase system or a multiple 3-phase system.

Figure 3:
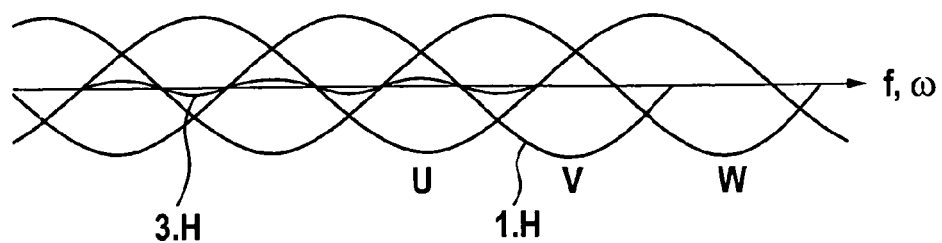
FIG. 3 shows a schematic view of an exemplary voltage curve of the three phases of the winding system of the machine with respective fundamental harmonic and third harmonic.

As illustrated in FIG. 3, the sinusoidal voltages and currents of the fundamental harmonic (designated 1. H. in FIG. 3) of the three phases U, V, W (which are offset from each other by 120° each) in a symmetric 3-phase system at all times add up to zero. The also sinusoidal voltages and currents of the 3rd harmonic (designated 3. H. in FIG. 3) in contrast thereto add up or accumulate, as they are each offset from each other by 120°·3=360°. Thus, with the delta connection of the winding system, a resulting circulating current is created due to the voltages of the 3rd harmonic.

According to the present invention, a high power density PM machine with concentrated winding (i.e. single coils) is operated on one or more active converter units having their (3-phase or 6-phase or multiple 3-phase) winding connected in a delta connection. The connection especially of larger electric machines in a delta connection so far is avoided when the induced voltage ($U_i$, "EMF") contains a significant 3rd (and other) harmonic, as the winding for the 3rd (and other) harmonic is short-circuited due to the delta connection. Due to this, there are created additional ohmic losses, temperature increases and torques (the maximum values thereof being present at very low speeds n, e.g. $n_B/100 \ldots n_B/1000$). With high power density electric machines, in particular PM machines, however, the inductance can be set so high that the resulting short-circuit current of the 3rd harmonic remains low and causes only little additional losses (e.g. 0.001 ... 0.01% of the rated power $P_B$). The additional iron losses saved by this short-circuit current (as the 3rd harmonic of the iron B-field is attenuated thereby) may be a multiple of these additional ohmic losses (especially at higher speeds n). Moreover, the idle-operation sound components caused by the 3rd harmonic (and others) are compensated to a very large extent, except at very low speeds n (e.g. up to a speed $n_B/100$, with a very rapid continuous decrease with increasing n).

The PM machine according to the invention is designed for a rated power in the range between 100 kW and 20 MW. The winding system has such a high inductance that the related total reactance $x_B$ during rated operation (inclusive of all counter and leakage reactances, related to the induced voltage thereof) according to $x_B = \omega_B \cdot L_Y \cdot P_B / (Z_{3P} \cdot U_{i,B}^2)$ is at least 0.8.

In said equation:

$\omega_B$ = the electric angular frequency of the winding system in rated operation, $L_Y$ = the phase or strand inductance of the winding system in star connection (Y-connection), $P_B$ = the power of the machine in rated operation (rated power), $Z_{3P}$ = the number of 3-phase systems of the machine, $U_{i,B}$ = the amount of the induced conductor voltage in rated operation.

Figure 2:
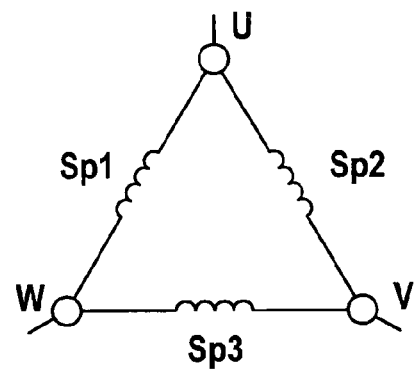
FIG. 2 shows an electric circuit diagram of the delta connection of the winding system of the machine according to FIG. 1.

According to the invention, the winding system is connected in the form of a delta connection, as shown in FIG. 2, in order to use this ring connection for attenuation (iron losses, sound) of upper harmonics (mainly the 3rd harmonic) while tolerating one or more circulating or ring currents, as described hereinbefore. By providing a high total reactance of the machine, the ring current remains limited, which thus limits the ohmic losses caused by the same as well.

The PM machine preferably is a high power density PM machine in an enhanced performance range, with respect to which, for the afore-mentioned reasons of the high short-circuit current, it was avoided before to connect the winding system in a delta connection. According to an advantageous embodiment of the invention, the PM machine is designed for a rated power in the range between 1 MW and 3 MW. In accordance with another advantageous embodiment of the invention, the PM machine is designed for a rated power in the range between 3 MW and 6 MW. In accordance with still another advantageous embodiment of the invention, the PM machine is designed for a rated power in the range between 6 MW and 15 MW. According to the concept according to the invention, a PM machine with high total reactance can be operated in a delta connection in these power ranges in particularly advantageous manner, so as to exploit the resulting ring connection for attenuation (in particular iron losses, sound) of upper harmonics (mainly the 3rd harmonic).

The invention claimed is:

1. A permanent magnet excited electric machine, comprising:

a stator part; and a moving part that is movable in relation to the stator part, one of said stator and moving parts having an electric winding system in the form of a single or multiple 3-phase system, and the other one of said stator and moving parts having permanent magnets, wherein the permanent magnet excited electric machine is designed for a rated power in the range between 100 kW and 20 MW and the winding system is connected in a delta connection and having an inductance such that the related total reactance $x_B$ in rated operation according to:

$x_B = \omega_B \cdot L_y \cdot P_B / (Z_{3P} \cdot U_{i,B}^2)$ is at least 0.8, in which $\omega_B$ = electric angular frequency of the winding system in rated operation, $L_y$ = phase inductance of the winding system, in star connection or transformed to star connection, $P_B$ = power of the machine in rated operation, $Z_{3P}$ = number of 3-phase systems of the machine, $U_{i,B}$ = amount of the induced conductor voltage in rated operation, wherein a short-circuit current of a 3rd harmonic arising in the winding system causes less Ohmic losses in a range between 0.001 and 0.01% of the rated power $P_B$.

2. The permanent magnet excited electric machine according to claim 1, characterized in that it is designed for a rated power in the range between 1 MW and 3 MW.

3. The permanent magnet excited electric machine according to claim 1, characterized in that it is designed for a rated power in the range between 3 MW and 6 MW.

4. The permanent magnet excited electric machine according to claim 1, characterized in that it is designed for a rated power in the range between 6 MW and 15 MW.

5. The permanent magnet excited electric machine according to claim 1, characterized in that it has a pole number 2p of at least 10.

6. The permanent magnet excited electric machine according to claim 1, characterized in that the winding system is provided in the form of a concentrated winding.

* * * * *